(12) United States Patent
Westbrook et al.

(10) Patent No.: US 6,277,349 B1
(45) Date of Patent: Aug. 21, 2001

(54) TRIDYMITE-BASED PROCESSING FOR HIGH PURITY QUARTZ

(76) Inventors: C. Eric Westbrook, 8021 Claytie Cir., Nashville, TN (US) 37221; Anna Michelle Benson, P.O. Box 17, Gladeville, TN (US) 37071

( * ) Notice: Subject to any disclaimer, the term of this patent is extended or adjusted under 35 U.S.C. 154(b) by 0 days.

(21) Appl. No.: 09/192,553

(22) Filed: Nov. 14, 1998

(51) Int. Cl.$^7$ ............................. C01B 33/12; C03B 32/00
(52) U.S. Cl. ............................................ 423/340; 423/335
(58) Field of Search ...................................... 423/340, 335

(56) References Cited

U.S. PATENT DOCUMENTS

| | | | |
|---|---|---|---|
| 1,983,271 | * 12/1934 | Earle | 423/340 |
| 4,804,422 | * 2/1989 | Papanikolau et al. | 423/340 |
| 4,956,059 | * 9/1990 | Englisch et al. | 423/340 |
| 5,037,625 | * 8/1991 | Loritsch et al. | 423/340 |
| 5,313,076 | * 5/1994 | Yamazaki et al. | 257/66 |
| 5,637,284 | * 10/1997 | Sato et al. | 423/340 |

FOREIGN PATENT DOCUMENTS

456513 * 9/1936 (GB).
6-92685 * 4/1994 (JP).

\* cited by examiner

Primary Examiner—Ngoc-Yen Nguyen
(74) Attorney, Agent, or Firm—B. J. Powell

(57) ABSTRACT

A process of purifying crystalline quartz to remove impurities within the lattice structure comprising the steps of heating the quartz to the tridymite polymorphic form and evaporatively reacting the heated quartz with an aqueous acid solution reactive with the impurities in the quartz to form water soluble metal salts. The residue of the evaporative reaction is washed with water to dissolve the metal salts leaving purified crystalline quartz. The disclosure also includes the product of the process.

16 Claims, 1 Drawing Sheet

TRIDYMITE-BASED PROCESSING FOR HIGH PURITY QUARTZ

BACKGROUND OF THE INVENTION

This invention relates generally to quartz processing and more particularly to the production of high purity quartz (BPQ) by evaporatively reacting preheated quartz in an acid solution to cool the quartz while at the same evaporating the liquid from the solution and reacting the acid with the quartz impurities to form soluble salts.

Natural quartz is often found in the presence of minerals such as feldspar, mica, kaolin, and garnet. Various means of mineral separation are normally employed to produce commercial grade products of each of these minerals, including industrial sand products as well. Such mineral processing steps are well known and are briefly described in U.S. Pat. No. 5,037,625. While such processing will provide gross separation of the quartz from the in-situ minerals of the deposit, the resultant sand product is usually only clean enough for construction or landscaping applications. Further processing is required to remove impurities still associated with the quartz particles, both on the surface and within the structure of the crystal itself, as well as other inclusions that cause difficulties in fusion of the quartz, in order for the purity of the quartz particles to be used in the semiconductor and high-intensity lighting industries.

An essential component to the semiconductor and high-intensity lighting industries is crystalline high purity quartz (silicon dioxide, $SiO_2$), commonly referred to as HPQ. HPQ is used for the manufacturing offused quartz products in both industries and is typically characterized by the low level of impurities present; these impurities include Al, Ca, Na, Mg, Fe, Ti, Li, K, and B.

The semiconductor industry is the largest user of fused quartz, producing wafers (integrated circuit substrates) and quartzware furniture (various accessories used in wafer manufacturing). The purity requirements for semiconductor processing are quite stringent with total impurity limits of 15 parts per million (ppm) or less for the purest HPQ products. Fused quartz is also used in the lighting industry primarily for bulb envelopes for high-intensity lights such as halogen, metal hydride, and mercury vapor lamps. This market has recently seen rapid expansion and is predicted to remain strong due to the halogen headlight requirement on more than eighty-five percent of new vehicle production. The purity requirements for fused quartz glassware are not, however, as demanding as those for semiconductor use, tolerating a total impurity level as high as 30 ppm.

An equally important parameter of the BPQ product is its melting or fusing characteristics. High purity granular quartz can be unsuitable for fused quartz production due to the presence of excessive gas and/or liquid inclusions or pockets distributed throughout the crystal. These inclusions are believed to be responsible for bubble formation in fused quartz; and excessive bubble content, as with excessive impurity content, is unacceptable for fused quartz in semiconductor and lighting applications.

Prior art techniques which have been employed for removal of surface bound impurities and reduction of bubble forming inclusions, both by producers of BPQ and users of HPQ who process low purity quartz feed, include leaching (caustic or acidic) and high temperature treatment with various acid contact to convert the impurities to soluble salts. These prior art processes are exemplified in the following patents:

| Patent No. | Inventor | Issue Date | Class/Subclass |
|---|---|---|---|
| 2,182,384 | McGregor | 12/1939 | 423/340 |
| 2,493,304 | McCready et al. | 1/1950 | 423/340 |
| 3,666,414 | Bayer | 5/1972 | 423/340 |
| 4,804,422 | Papanikolav et al. | 2/1989 | 423/340 |
| 4,818,510 | Jung | 4/1989 | 423/340 |
| 4,956,059 | Englisch et al | 7/1990 | 423/340 |
| 4,983,370 | Loritsch et al | 1/1991 | 423/340 |
| 5,037,625 | Loritsch et al. | 9/1991 | 423/340 |
| 5,637,284 | Sato et al. | 1/1997 | 423/430 |

U.S. Pat. No. 4,804,422 describes the purification of sand by means of acid washing in which at least 40% of the initial weight of the sand is dissolved.

Impurity removal from within the structure of the crystalline lattice of the quartz, however, requires interstitial access that is generally not possible with external leaching without the dissolution or etching of the quartz from the strong acidic or basic washing. U.S. Pat. No. 4,818,510 discloses the method of heating to at least 1650° C. and quenching (as defined in the patent as the introduction into an environment at least 200° C. cooler) in an attempt to fracture the quartz particles and expose occluded and interstitial impurities. The fractured quartz particles can then be treated with further leaching and heat treatment steps. This method, used in conjunction with selective sizing, has proven inadequate to achieve the very low impurity levels required for the most stringent of semiconductor specifications.

U.S. Pat. No. 2,182,384 describes the recovery of sand from grinding debris resulting from glass grinding and polishing including treatment with chlorine gas at temperatures of 1400–1800° F. U.S. Pat. Nos. 4,983,370 and 5,037,625 teach contacting surface-cleaned quartz with HCl gas at a temperature of 800° C. to 1600° C. for a duration of several minutes to as long as several hours. These methods are designed to diffuse the impurities to the quartz surface to form chloride salts which can then be removed. U.S. Pat. No. 2,493,304 describes a furnace for treating quartz by cascading the quartz over a series of discs while countercurrent flowing air and chlorine gas through the cascading quartz in order for the chlorine to react with the quartz impurities and the air to carry away the reaction products leaving reduced impurity quartz.

U.S. Pat. No. 3,666,414 discloses the treatment of rock crystal to produce fused silica which includes treatment with silicon tetrachloride followed by extended heating to drive off the hydrogen chloride gas and drying under vacuum.

U.S. Pat. No. 4,956,059 discloses a process wherein the quartz is heated to a range of 700–1300° C. in a rotary kiln, the kiln rotated to thoroughly mix the heated quartz while gaseous chlorine or hydrogen chloride is passed through the chamber. After chlorine treatment, the treated quartz is allowed to rest for at least ten times longer than the treatment period while an electric field of 600–1350 volts is imposed across the chamber. This process is repeated several times during the treatment of the quartz. U.S. Pat. No. 5,637,284 discloses a continuous process utilizing high temperature reaction in a chlorine-containing gas atmosphere, followed by a gas desorption step.

High temperature chlorination has proven to be the most effective final processing step to date to achieve the purest HPQ product from natural crystalline quartz. Prior art methods utilizing chlorination are expensive and limited to the use of hydrogen chloride, primarily due to the requirement of prolonged thermodynamic stability at 800°–1600° C.

SUMMARY OF THE INVENTION

These and other problems and disadvantages associated with the prior art are overcome by the invention disclosed herein by providing a process for the production of extremely high purity quartz without the limitation of hydrogen chloride or chlorine-containing gas while maintaining a lower production cost by avoiding long duration, high temperature processing.

The objectives of the present invention are achieved by utilizing the least dense quartz phase state, tridymite, which has the most open quartz crystalline structure. This state provides the greatest access to interstitial sites within the crystal structure, and in turn, provides the greatest potential for foreign ion removal from the lattice.

The transformation to the tridymite state is achieved by heating the quartz particles into the temperature range of 867° to 1470° C. at atmospheric pressure. The open structure of the higher temperature phase is maintained by thermal agitation of the applied heat until the hot particles are deposited into an ambient temperature aqueous acid solution such as HBr, HCl, HF, HI, $HNO_3$, $H_2SO_4$, or any acid which is capable of forming soluble metal salts. This causes immediate vaporization of the solution while providing nearly instantaneous reaction with the interstitial impurities such as Na, K, and Ca in the transformed crystalline structure, to form salts that can then be removed by washing. It is important that the volume of acid solution to quartz weight ratio be selected to insure substantially all of the solution is evaporated by the evaporative reaction process and a ratio of about 0.5 ml of acid solution to 1 gm of quartz has been found satisfactory. At the same time, it is also important that the heated quartz be returned to a polymorphic form where the crystalline lattice structure is not susceptible to further contamination as the quartz is cooled to ambient temperature. Another advantage of the process of the invention is that the heated quartz is maintained in an impurity reaction atmosphere until the quartz is cooled to a temperature at which no further intracrystalline inclusion of impurities usually takes place and cooling the quartz in the impurity reaction atmosphere until the quartz reaches a temperature less than about 500° C. The cooling of the quartz to this temperature range is inherent in the process of the invention.

The process of this invention provides extremely purified quartz particles which are especially suited for semiconductor application. This purification process is achieved with minimum acidic washing and without prolonged high temperature treatment or corrosive atmospheres.

These and other features and advantages of the invention will become more clearly understood upon consideration of the following detailed description and accompanying drawing in which:

Figure 1:
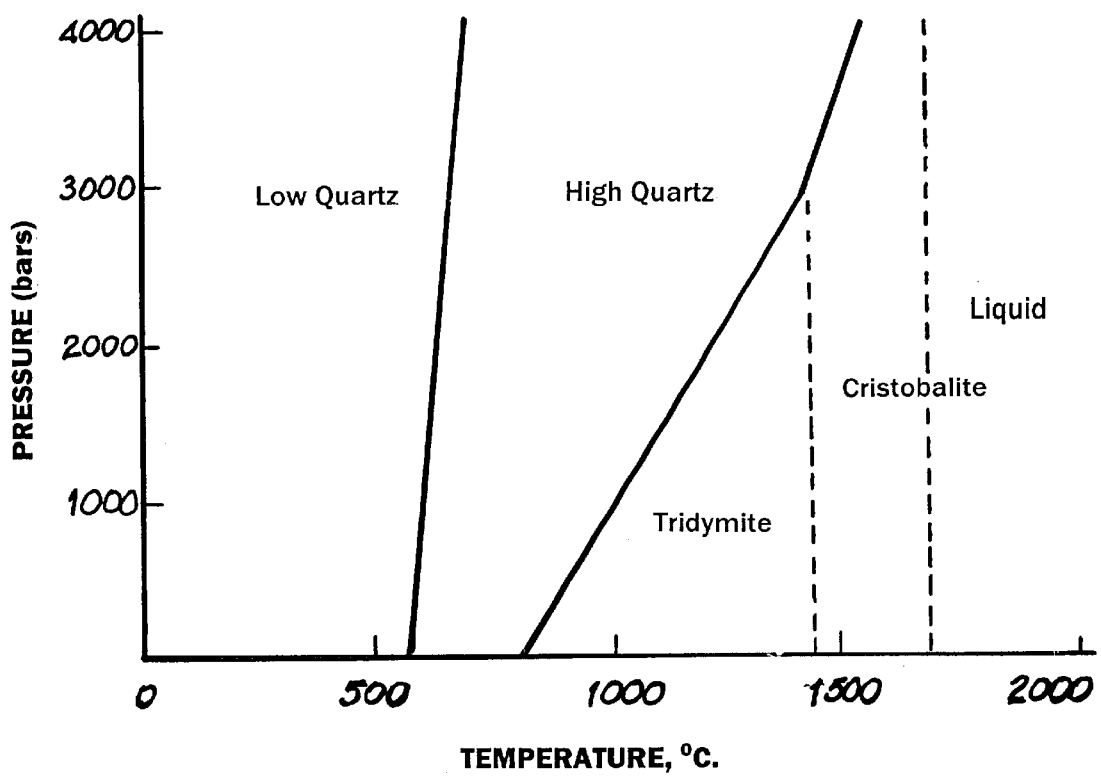
FIG. 1 is a phase diagram for quartz.

This figure and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

The production of high purity quartz is a series of increasingly exacting steps of beneficiation which progressively remove more minute degrees of impurity away from and eventually out of the silicon dioxide crystals themselves. This process begins with the initial crushing of the crude ore to provide rudimentary liberation of the quartz material from the coexistent minerals of the ore. Subsequent physical processing steps such as size and density classification provide further beneficiation, especially as preparation for chemical processing steps such as heavy liquid separations or multiple-stage flotation which generally provide what is considered to be complete mineral separation.

The quartz at this stage of processing is still quite contaminated and usually requires additional selective flotation as well as high intensity magnetic separation to reach a level of purity at which washing or leaching of the particulate surfaces can be most effective. All processing to this point, however, has little effect upon the impurity content which is within the quartz particles or more precisely, the foreign ions which are substituted within the structural lattice or reside within the interstitial locations of the lattice.

The process of the invention includes the steps of heating the quartz crystals to a prescribed temperature for a prescribed period of time sufficient to convert a major proportion of the quartz crystals to the tridymite polymorph form, evaporatively reacting the heated tridymite with an aqueous acid solution at ambient temperature which is capable of forming soluble metal salts, and washing the reacted product to dissolve and remove the reacted salts from the quartz. Preferably, the active amount of acid is selected to be in the range of ten to ten thousand times the stoichiometric equivalence of the existing impurity content in the quartz on a molar basis; and the liquid to solid ratio is approximately 0.5 ml. of aqueous acid solution per solid gram of quartz. Preferably, the amount of aqueous acid solution is selected to minimize contact time with the heated quartz and is typically no more than about ten seconds.

Evaporative reaction as used herein means that when the heated tridymite is deposited into a prescribed volume of the aqueous acid solution, the liquid in the acid solution is flash evaporated while the acid virtually instantaneously reacts with the impurity ions in the quartz lattice crystalline structure to form soluble salts. This leaves a substantially dry residue comprising the purified quartz crystals and reacted metal salts. The temperature difference between the heated quartz and the aqueous acid solution must be such that the flash evaporation process is virtually instantaneous, that is less than about ten seconds, and that virtually complete evaporation of any liquid takes place. It will be appreciated that the quartz particles are inherently cooled by this evaporative reaction process. This process is illustrated as a batch-type process so that each batch of quartz being treated is heated and then dumped into a prescribed volume of aqueous acid solution for the evaporative reaction step. It is to be understood, however, that the process may be performed in a continuous manner without departing from the scope of the invention. The evaporative reaction is sufficiently explosive to throw the residue over a large area and the process is carried out in a container much larger in volume that of the aqueous acid solution to give sufficient room for the evaporative reaction process to proceed unimpeded.

The premise of this invention lies in the fact that crystalline silica exists in different forms or polymorphs. As seen in FIG. 1, the three major forms which are stable at different temperatures are quartz (low and high, also referred to as alpha and beta, respectively), tridymite, and cristobalite. These three polymorphs have different lattice structures and therefore exhibit different physical characteristics. These three silica polymorphs are composed of tetrahedral groups of four oxygen atoms surrounding a central silicon atom. These tetrahedra are linked together to form a three-dimensional network, but the pattern of linkage differs for each polymorph.

Cristobalite and tridymite have relatively open lattice structures as compared to quartz (both low and high) and this fact is reflected in both the densities and refractive indices of each crystalline form as shown in the table below.

| Polymorph | Density | Mean R. Index |
| --- | --- | --- |
| Quartz | 2.65 | 1.55 |
| Cristobalite | 2.32 | 1.49 |
| Tridymite | 2.26 | 1.47 |

The lowest density, indicating the most open lattice structure, is associated with the tridymite form which exists within the temperature range of 873° to 1470° C. This temperature range is between the temperature ranges for quartz and cristobalite at atmospheric pressure.

Unlike the transformation from low to high quartz which involves the bending of bonds between neighboring atoms or ions, the transformation from quartz to tridymite requires that the linking of the $SiO_4$ tetrahedra has to be completely broken down and rearranged in order to form the different pattern of linkage which defines the structure of tridymite. It is during the reforming of the linkage pattern that foreign ions, especially those residing in the interstitial locations of the quartz structure are believed to be susceptible for reaction to form soluble salt compounds which can be removed by rinsing with de-ionized or distilled water. Examples of salt formation by this reaction would include NaBr, NaI, NaCl, $NaNO_3$, and $Na_2SO_4$, among others.

In the process of the invention, the temperature of the quartz particles should be raised to the tridymite temperature range (870° C.–1470° C. at atmospheric pressure). The time of heating should be sufficient for the silicon dioxide mass to reach thermal stability within the prescribed temperature range to insure that all of the quartz is in the tridyrmite polymorph form. The tridymite can then be introduced directly into the aqueous acid solution at ambient temperature for complete solid-liquid contact.

The strength of the aqueous acid solution is dependent upon the desired ratio of active acid to $SiO_2$, and is diluted as required to maintain an optimum solution volume. The empirically derived liquid to solid ratio to achieve a minimum contact time (typically up to 10 seconds) is approximately 0.5 ml of aqueous acid solution per solid gram of quenched $SiO_2$. It is preferred that complete evaporation is achieved during the reaction process. The active amount of acid can range from ten to ten thousand times the stoichiometric equivalence of the existing impurity content on a molar basis.

It is believed that, during the reaction process described herein, the reactant acid concentration increases with the progressive evaporation of the dilution water of the acid solution. As such, the $SiO_2$ particles encounter a concentration gradient of the reactant acid which synergistically affects the activity coefficient of the reactant acid. This synergism is unique for the processing of high purity quartz.

The brief contact and vaporization of the aqueous acid solution does not necessitate prolonged thermal stability normally required by traditional high temperature chlorination processing and thus is not restricted to the use of HCl as set forth in U.S. Pat. No. 5,037,625. The process of this invention has no such restriction and allows the use of ambient temperature aqueous acid solutions such as HBr, HCl, HF, HI, $HNO_3$, $H_2SO_4$, or any acid which is capable of forming soluble metal salts.

The following nonmiting examples are illustrative of the present invention and demonstrate the impurity removal from the process of acid quenching the tridymite phase of crystalline $SiO_2$.

EXAMPLE 1

A quartz sample was pretreated by means of selective flotation, magnetic separation, and acid washing and contained 0.2 ppm Ca, 0.3 ppm K, 0.5 ppm Na, and 0.6 ppm Fe, for a total of 1.6 ppm for these elements. This sample was heated to and maintained at 1200° C. for one hour. Portions of the sample were evaporatively reacted with the different acids using the 0.5 ml acid per 1.0 g sand ratio. After reaction, the residual quartz was washed with de-onized water to dissolve the metal salts and remove them from the purified quartz and the cleaned quartz was then dried in conventional manner. Results are shown as ppm.

| Impurity | After Pretreatment | After treatment with HI | After treatment with $H_2SO_4$ | After treatment with HBr | After treatment with HCl |
| --- | --- | --- | --- | --- | --- |
| Ca | 0.2 | 0.2 | 0.1 | 0.2 | 0.3 |
| K | 0.3 | 0.2 | 0.2 | 0.3 | 0.4 |
| Na | 0.5 | 0.3 | 0.4 | 0.4 | 0.6 |
| Fe | 0.6 | 0.4 | 0.5 | 0.6 | 0.4 |
| Total | 1.6 | 1.1 | 1.2 | 1.5 | 1.7 |

Acid activity: HI = 57%, $H_2SO_4$ = 96%, HBr = 48%, HCl = 36%

EXAMPLE 2

A quartz sample was pretreated by means of selective flotation, magnetic separation, and acid washing. A portion of this sample was heated to and maintained at 1200° C. for one hour and another portion was heated to and maintained at 1200° C. for four hours. Both samples were evaporatively reacted with HI (activity=57%). After reaction, the residual quartz was washed with de-ionized water to dissolve the metal salts and remove them from the purified quartz and the cleaned quartz was then dried in conventional manner. The results are shown as ppm.

| Impurity | After Pretreatment | After 1 hour heating | After 4 hours heating |
| --- | --- | --- | --- |
| Ca | 0.8 | 0.5 | 0.3 |
| K | 0.5 | 0.5 | 0.3 |
| Na | 0.7 | 0.6 | 0.4 |
| Fe | 0.7 | 0.5 | 0.5 |
| Total | 2.7 | 2.1 | 1.5 |

EXAMPLE 3

A quartz sample from an ore reserve different from that for Examples 1 & 2 is purified by the same methods of the first two samples. The sample is heated to and maintained at 1200° C. for one hour and evaporatively reacted with $H_2SO_4$ (activity=96%) with the 0.5 ml acid to 1.0 g sand ratio. After reaction, the residual quartz was washed with de-ionized water to dissolve the metal salts and remove them from the purified quartz and the cleaned quartz was then dried in conventional manner. The results are shown as ppm.

| Impurity | After Pretreatment | After treatment with $H_2SO_4$ |
|---|---|---|
| Ca | 0.5 | 0.4 |
| K | 0.2 | 0.1 |
| Na | 0.7 | 0.4 |
| Fe | 0.2 | 0.2 |
| Total | 1.6 | 1.1 |

Various changes and/or modifications will present themselves to those skilled in the art and may be made in the process of this invention without departing from the spirit of the present invention, whose scope is commensurate with the following claims.

What is claimed is:

1. A process for removing at least some of the impurities within the lattice structure of crystalline quartz comprising the steps of:
   A) heating crystalline quartz with impurities within the lattice structure thereof sufficiently to convert a major portion of the crystalline quartz to the tridymite polymorphic form; and,
   B) depositing the heated crystalline quartz containing the impurities into an aqueous acid solution whereby the acid in the acid solution reacts with at least some of the impurities within the lattice structure of the quartz to form soluble salts and effectively remove the reacted impurities from the lattice structure of the crystalline quartz while simultaneously evaporating the liquid in the aqueous acid solution and thereby cooling the crystalline quartz to a temperature below the tridymite polymorphic form, the volume of the aqueous acid solution selected such that substantially all of the liquid in said aqueous acid solution is evaporated to obtain a residue containing purified quartz crystals and said soluble salts, and the active amount of acid in said aqueous acid solution selected to react with a sufficient amount of the impurities within the lattice structure of the crystalline quartz to thereby reduce the amount of at least some of the impurities in said crystalline quartz.

2. The process of claim 1 wherein step A) comprises heating the crystalline quartz containing the impurities within the lattice structure thereof to a temperature of 870–1470° C. at atmospheric pressure.

3. The process of claim 1 wherein step A) includes heating the crystalline quartz containing the impurities within the lattice structure thereof for a sufficient amount of time to convert substantially all of the crystalline quartz to the tridymite polymorphic form.

4. The process of claim 1 wherein step B) includes depositing the heated crystalline quartz containing the impurities within the lattice structure thereof in said aqueous acid solution while said aqueous acid solution is at ambient temperature.

5. The process of claim 1 wherein the volume of the aqueous acid solution in step B) is about 0.5 ml of aqueous acid solution per 1.0 g of crystalline quartz containing the impurities within the lattice structure thereof.

6. The process of claim 1 wherein the active amount of acid in said aqueous acid solution in step B) is about ten to ten thousand times the stoichiometric equivalence of the existing impurity content within the lattice structure of the crystalline quartz on a molar basis.

7. The process of claim 1 wherein said aqueous acid solution contains an active acid selected from the group comprising HI, $H_2SO_4$, HBr, HF, and $HNO_3$.

8. The process of claim 1 further comprising the step of:
   C) washing the residue from step B) with water to dissolve the soluble salts and recover the remaining purified quartz crystals.

9. The process of claim 1 further comprising the step of removing any surface impurities from said crystalline quartz prior to step A).

10. The process of claim 1 wherein in step A), said heating the crystalline quartz containing the impurities within the lattice structure thereof is at a temperature of 870–1470° C. for at least one hour.

11. The process of claim 1 wherein in step A), said heating the crystalline quartz containing the impurities within the lattice structure thereof is at a temperature of 870–1470° C. for about 1–4 hours.

12. The process of claim 1 wherein in step B), the volume of said aqueous acid solution is selected such that substantially all of the liquid in said aqueous acid solution is evaporated in a time period of less than ten seconds.

13. The process of claim 1 wherein step B) further includes maintaining said crystalline quartz within the evaporative reactive atmosphere formed as the liquid in the aqueous acid solution is being evaporated until said crystalline quartz is cooled to a stable temperature below the temperature at which said quartz will reocclude impurities into the crystalline lattice structure of the quartz.

14. A process for purifying crystalline quartz containing impurities within the lattice structure thereof to remove at least some of said impurities, the process comprising:
   a) heating the crystalline quartz to a temperature of 870–1470° C. at atmospheric pressure for about 1–4 hours; and
   b) depositing the heated crystalline quartz into an aqueous acid solution at ambient temperature with a volume of about 0.5 ml of the aqueous acid solution per 1.0 g of heated crystalline quartz and an active acid content of about ten to ten thousand times the stoichiometric equivalence of the existing impurity content within the lattice structure of the crystalline quartz on a molar basis, wherein the active acid in the aqueous acid solution reacts with at least some of the impurities within the lattice structure of the crystalline quartz to form soluble salts, the liquid in the aqueous acid solution is evaporated thereby cooling the crystalline quartz below the temperature at which said quartz will reocclude impurities into the lattice structure of the crystalline quartz and forming a residue containing a purified crystalline quartz and said soluble salts.

15. The process of claim 14 wherein said aqueous acid solution contains an active acid selected from the group consisting HI, $H_2SO_4$, HBr, HF, and $HNO_3$.

16. The process of claim 15 further comprising the step of:
   c) washing the residue of step b) with water to dissolve the soluble salts and recover the purified crystalline quartz.

* * * * *